July 10, 1945. A. E. RUTTER 2,380,190
DUMP RAKE
Filed May 2, 1942 3 Sheets-Sheet 1

INVENTOR
Alvah E Rutter
BY
Emerson B Donnell
ATTORNEY

INVENTOR
Alvah E Rutter
BY
Emerson B Donnell
ATTORNEY

July 10, 1945.  A. E. RUTTER  2,380,190
DUMP RAKE
Filed May 2, 1942   3 Sheets-Sheet 3

INVENTOR
Alvah E Rutter
BY
Emerson B Donnell
ATTORNEY

Patented July 10, 1945

2,380,190

UNITED STATES PATENT OFFICE 2,380,190

DUMP RAKE

Alvah E. Rutter, Rockford, Ill., assignor to J. I. Case Company, Racine, Wis., a corporation Application May 2, 1942, Serial No. 441,439

5 Claims. (Cl. 56—27)

The present invention relates to dump rakes or self dumping hay rakes and an object of the invention is to generally improve the construction and operation of devices of this class.

Rakes of this general nature have been used in the past and drawn by horses and comprise a two-wheeled trailer vehicle, the major portion of which consists of a rake head carrying a number of curved teeth. These gather material as the vehicle is drawn over the field and at predetermined times an operater seated on the vehicle trips suitable mechanism which engages the rake head with the carrying wheels to rotate therewith. Such rotation raises the rake teeth and releases the load of material accumulated therein. At a certain point in such rotation, namely when the teeth have been raised sufficiently to release the load, the head is automatically released from the wheels and allowed to return to operating position. Normally, a manually operable member, such as a pedal, is provided so that the operator may hold the rake teeth in working position against the pressure of the load under conditions where this is necessary, and means is provided for locking or "hooking" the rake head and teeth in raised position for transportation of the machine.

It is desirable that such a rake be adapted to use behind a tractor and the principal object of the present invention is to provide suitable mechanism on the rake controllable from the tractor and which will perform the several functions formerly served by the operator on the rake, but under control of the operator on the tractor, whereby the necessity for an operator on the rake will be eliminated.

Further objects and advantages will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

In the drawings,

Fig. 3 is a plan view with parts removed and others broken away, of certain mechanism indicated in Fig. 1.

Fig. 4 is a sectional elevation on the line 4—4 of Fig. 3 with parts removed and others broken away.

Figure 1:
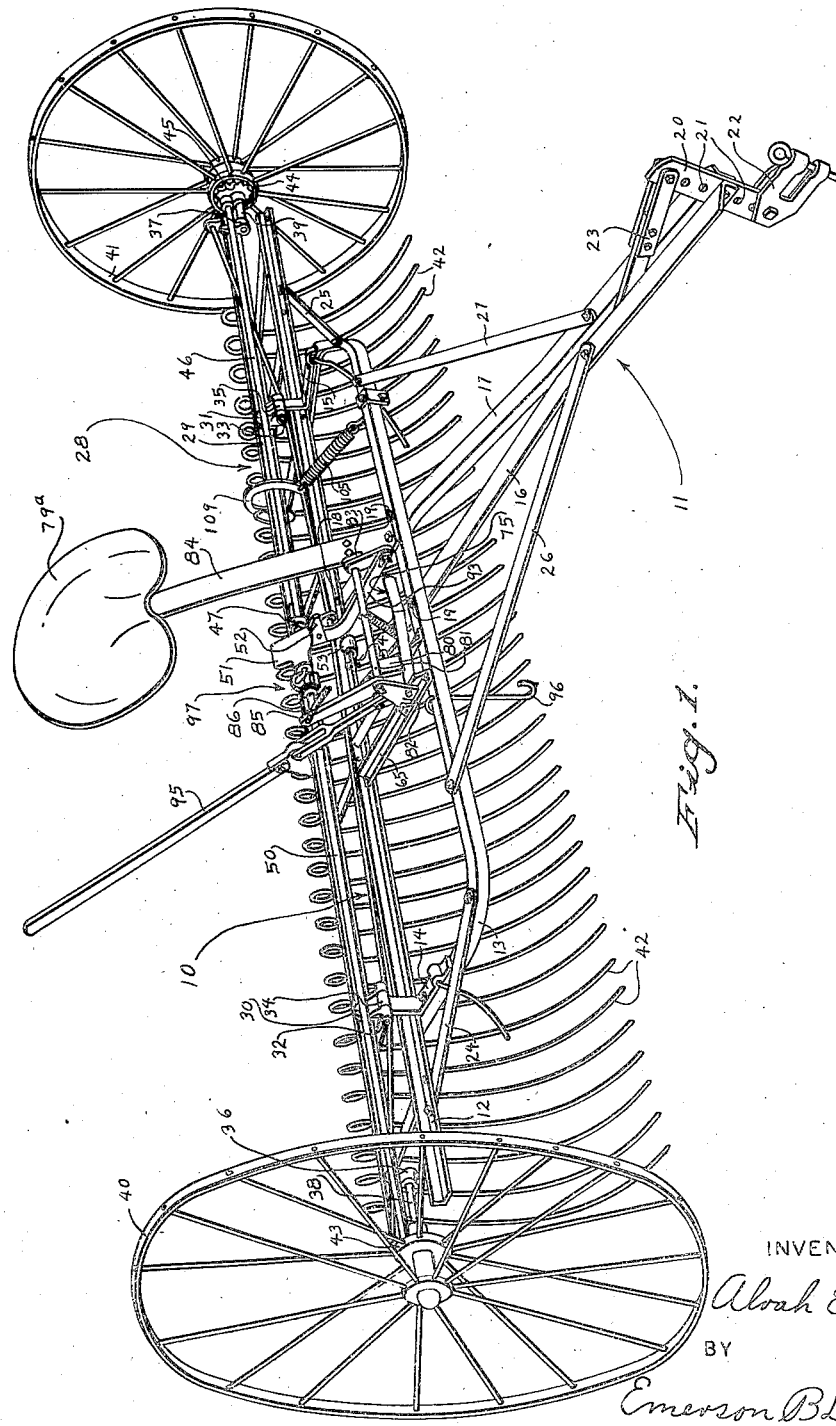
Figure 1 is a perspective view of a rake embodying the invention.

As seen in Fig. 1 the machine comprises a main or stationary frame generally designated as 10 to which is attached a draw bar generally designated as 11, frame 10 comprising a rear rail or the like 12 and a bow-like forward rail or member 13 fixed therewith in any suitable manner as by fittings 14 and 15. Draw bar 11 comprises elements 16 and 17 engaged with both rear member 12 and forward member 13 by suitable means such as bolts 18—18 and 19—19 and they are united at their forward ends by a bar or member 20 extending transversely and providing a series of holes 21—21 for reception of a clevis 22 of well-known form for attachment of a tractor, not shown. Bar 20 is braced by a member 23 extending backwardly and fixed in any suitable manner with members 16 and 17. Braces 24 and 25 extend from member 13 to member 12 and other braces 26 and 27 extend from draw bar 11 to member 13, the whole constituting a substantially rigid frame-work for the rake.

Member 10 is supported partly from draw bar 11 and partly from a rake head generally designated as 28 and comprising a beam or member 29 extending in the direction of rear member 12. Beam 29 serves the purposes of a rake head and an axle for the machine, fittings 30 and 31 carried by member 29, and pivot bolts 32 and 33 engaging ears 34 and 35 respectively on fittings 14 and 15, so that member 12 and accordingly the main frame of the rake is supported from head member or axle 29, but axle 29 is free for limited pivotal movement relatively to member 12.

Member 29 has fittings 36 and 37 in which are engaged stub axles 38 and 39 on which are journaled wheels 40 and 41. As will be apparent wheels 40 and 41 carry the machine through stub axles 38 and 39 and member 29.

Member 29 carries a plurality of rake teeth 42—42 of suitable or well-known form so shaped as to gather material as the rake moves over the field, and mechanism is provided for preventing rotation of member 29 with teeth 42 in a downward position. Mechanism is also provided for rotating member 29 to a limited extent to raise teeth 42 above material which has been accumulated by the teeth.

Figure 2:
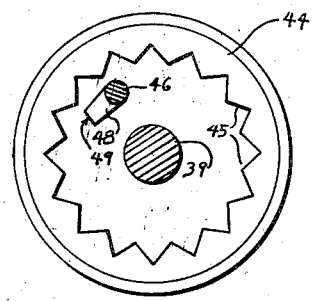
Fig. 2 is a sectional elevation of a wheel hub and associated structure.

In general, this is accomplished by connecting member 29 temporarily to wheels 40 and 41, substantially identical mechanism being used at either end of member 29, only one description should be necessary. Wheel 40 has a hub portion 43 and wheel 41 has a hub portion 44 within which are provided a plurality of teeth 45—45. A dump shaft 46 is rockably supported in fitting 37 and a bearing 47 on member 29 and, as more particularly shown in Fig. 2, has an offset or dog portion 48 within hub 44 and normally positioned to clear teeth 45. As will be apparent, clockwise rotation of shaft 46 will move dog portion 48 into engagement with one or another of teeth 45 and cause dog 48 and shaft 46 to follow hub 44 in its rotation. This will carry fitting 37 and member 29 and therefore cause rotation of member 29 and dumping of rake teeth 42 as will be apparent. Preferably, although not necessarily, dog portion 48 has a face 49, the angle of which is so chosen that there will be a tendency for the force of teeth 45 to disengage dog 48. In operation, the dog is yieldingly engaged with teeth 45 as will appear so that rotation of member 29 is normally positive, but in the event of blocking of member 29, or any excessive resistance to rotation, dog 48 may be forced out of engagement with teeth 45 before the stresses become great enough to destroy or damage any part of the machine.

A dump shaft 50 of similar construction extends to hub 43, the mechanism therein being substantially identical with that of hub 44.

Dump shafts 46 and 50 are united by a fitting or trip 51 and accordingly connections for rocking member 51 will rotate shafts 46 and 50 and engage head 28 with wheels 40 and 41 as above outlined. Fitting 51 has a tongue 52 projecting forwardly therefrom in a position such that upon rotation of head 28 about pivots 32 and 33, tongue 52 will encounter a trip plate or abutment 53 adjustably clamped on member 12 by bolts or the like 54. It will now be apparent that rotation of fitting 51 so as to produce downward movement of tongue 52 will engage head 28 for dumping movement. Such movement will continue until tongue 52 encounters plate 53 when fitting 51 will be caused to rotate in a reverse direction relatively to head 28 thereby disengaging dog 48 and its companion dog in hub 43 and allowing head 28 to return to raking position. Shifting of plate or abutment 53 will provide for changing the position of head 28 at which this action takes place.

As seen in Figs. 3 and 4, rake head 28 is held in raking position by means of a toggle generally designated as 55 comprising in the present instance a member 56 preferably bifurcated and pivoted at 57 to a fitting 58 fixed with rail or member 29. Member 56 is pivoted at 59 in the present instance to a pair of links 60 and 61, pivoted in turn by pins 62 and 63 carried in frame members 64 and 65 extended between members 12 and 13. In the present instance, frame members 64 and 65 consist of angle irons having upright flanges 66 and 67 within which are engaged above mentioned pins 62 and 63, and said pins are further braced by means of brackets 68 and 69 spaced from flanges 66 and 67 and welded or otherwise suitably fastened to angle irons 64 and 65. Member 56 has a stop pad 70 engageable with the under sides of members 60 and 61 to limit the upward travel of pivot 59. Pivot 59 also has extending therefrom links 71 and 72 for controlling the position of pivot 59. Links 71 and 72 are pivoted at 73 to a lever arm 74 of a pedal member generally designated as 75. Pedal 75 is fulcrumed on a pin 76 also engaged in flanges 66 and 67, and braces 77 and 78 extend from a pedal arm 79 of pedal 75 outwardly to approximately the point of juncture of pin 76 and flanges 66 and 67. In this way, a relatively rigid arrangement is provided and the toggle 55 may be placed on approximately dead center without likelihood of buckling transversely of its normal plane of movement. Stop pad 70 on member 56 may be so placed as to limit upward motion of toggle 55 as desired, in the present instance permitting toggle 55 to take an upward position so that pivot 59 lies slightly above the plane of pivots 57 and 62—63. Thus any force developing a tendency toward clockwise rotation about pivot 33 will be resisted by the full strength of toggle 55.

The dimensions of the parts are so chosen that the weight of toggle 55 and links 71 and 72 under normal conditions will cause toggle 55 to descend if an operator's foot is removed from pedal 75. Toggle 55 therefore would descend under these conditions toward the dotted position indicated so as to permit forward or clockwise rotation of rake head 28. Under these conditions, rake head 28 may be rotated by engagement of wheels 40 and 41 as above outlined.

In order to make the rake operative, without an operator on seat 79a, a tongue 80 is provided fixed with a shaft 81 journaled in brackets 82 and 83 carried respectively on above mentioned frame member 65 and a spring member 84 of above mentioned seat 79a. Shaft 81 has an upwardly extending arm 85 to which is attached a rope 86 or the like extending to a convenient point on the tractor, not shown. A pull on rope 86 will accordingly rock shaft 81 in a clockwise direction as seen in Fig. 4. To return shaft 81 to the position shown, a spring 87 is extended between an eye 88 and an anchorage 89 on any convenient part of the machine, as for example draw bar portion 16.

As clearly apparent in Fig. 4, tongue 80 in the position shown, contacts pedal 75 forwardly of fulcrum 76 or may do so if pedal 75 tends to rise. Such movement of the pedal is accordingly prevented. On the other hand, upon rotation of shaft 81, caused by a pull on rope 86, tongue 80 travels in the path indicated in dotted lines and contacts the upwardly extending rear portion or arm 74, first, passing to a position rearwardly of fulcrum 76. Pedal 75 is therefore free to rise and contact of tongue 80 and lever arm 74 forces the latter backwardly thereby causing downward movement of pivot 59. Toggle 55 is accordingly unlocked or started toward the dotted position indicated whereby rake head 28 is free to move in a clockwise direction around pivot 33.

Shaft 81 also has an arm 90 thereon engaged by means of a pin 91 extended into a slot 92 in a rod 93 which extends rearwardly and then upwardly to a pivot 94 on above mentioned tongue 52. Pivot 94 is so located that backward motion of rod 93 will cause clockwise rotation of tongue 52 and accordingly of shafts 46 and 50 and the length of slot 92 is so chosen that pin 91 will cause rearward movement of rod 93 after tongue 80 has unlocked toggle 55 as above described. This will engage dog portion 48 and its companion portion in hub 43 and cause rake head 28 to commence its rotary or dumping movement. The movement continues until tongue 52 encounters stop plate 53, as above described, when tongue 52 is given counterclockwise movement disengaging the above mentioned dogs and allowing rake head 28 to return to operative position.

Fitting 58 has a hand lever 95 fixed therewith and which moves with rake head 28. When it is desired that rake head 28 remain in inoperative position, as for example, when transporting the rake, lever 95 may be engaged by a hook 96, Fig. 1, which prevents return movement of rake head 28 in well-known manner.

Suitable mechanism is utilized to maintain shafts 46 and 50 in shifted positions during the different phases of the cycle of operation.

Figure 5:
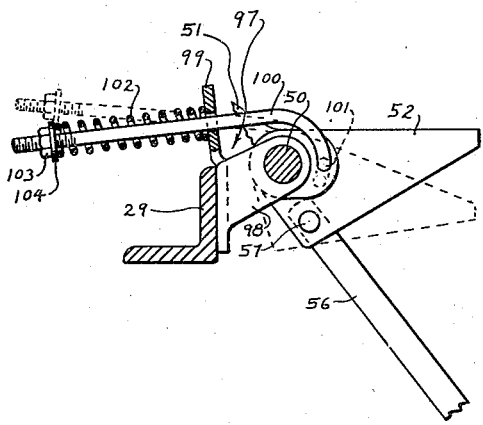
Fig. 5 is a detail of certain mechanism indicated in Figs. 1 and 4.
Figure 6:
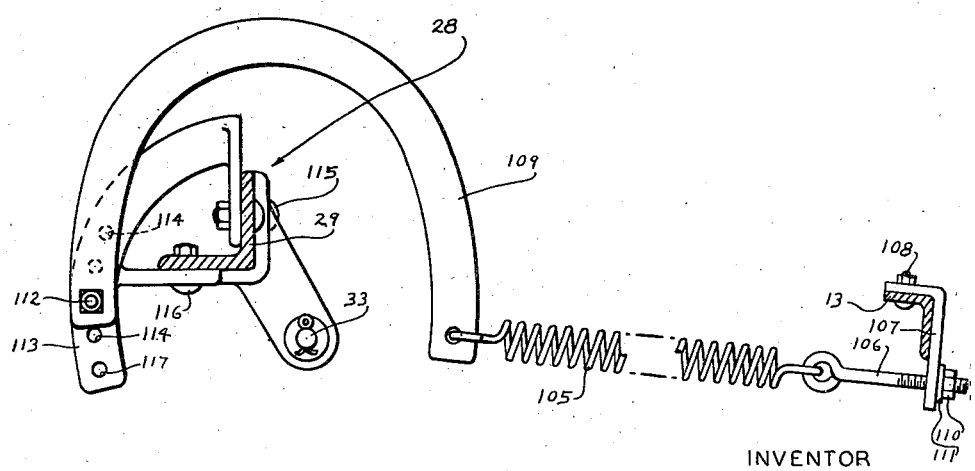
Fig. 6 is an enlarged detail of certain mechanism indicated in Fig. 1.

As seen in Fig. 5, a fitting generally designated as 97 is fixed with rail member 29 and has a bearing portion 98 for carrying above mentioned shaft 50. Fitting 97 also has an upstanding ear 99 apertured for passage of a rod 100, extending in the present instance above shaft 50 and bending downwardly to a pivot 101 in above mentioned fitting 51. Rod 100 is urged rearwardly by a spring 102 in the present instance compressed between ear 99 and a nut 103, a washer 104 being interposed if desired. The backward pull in rod 100 being in the position shown above the center of shaft 50 tends to maintain tongue 52 in upper position. However, if tongue 52 is depressed to the dotted position, it will be noted that the line of pull passes below the center of shaft 50 so as to tend to hold tongue 52 in the depressed position. This corresponds to the engaged position of dog 48 and its companion in hub 43. The above mentioned dogs accordingly stay in engaged position once tongue 52 is depressed, and also in disengaged position when tongue 52 is raised. Rake head 28 and its attached teeth 42 constitutes a substantial weight and for this reason an assisting spring 105 is extended between member 13 and a suitable point on rake head 28. Referring more particularly to Fig. 6, spring 105 is tensioned between an eyebolt 106 engaged in a bracket 107 fixed as by a bolt 108 with member 13 and a C shaped member 109. Bolt 106 has a nut 110 for transmitting the pull of spring 105 to bracket 107, a washer 111 being interposed if desired. C shaped member 109 is pivotally connected by a bolt or the like 112 with a quadrant 113 having a plurality of holes 114—114 for reception of bolt 112, as will be apparent from Fig. 6. The line of pull of spring 105 is above pivot 33 so that the resulting couple tends to lift teeth 42 by causing clockwise rotation of rake head 28. Quadrant 113 is fixed to rail member 29 as for example by bolts 115 and 116. For different operating conditions, bolt 112 may be inserted in other holes 114 to give a greater or lesser degree of assistance to the lifting of rake head 28. One or more holes 117 are preferably provided below the level of pivot 33. If bolt 112 is engaged in hole 117, the line of pull is such that rake head 28 tends to rotate in a counterclockwise direction so as to tend to force teeth 42 down into the material being raked. This condition exists only until the rake is lifted a short distance, after which bolt 112 is raised above pivot 33 and the direction of force on the rake is reversed. The effect of spring 105 is then again to assist in the lifting of the rake as is continually the case where bolt 112 is engaged in one of holes 114.

The above being a complete description of an illustrative embodiment of the invention, what is claimed as new and desired to be secured by Letters Patent of the United States is:

1. In a tractor drawn dump rake having a head, rake teeth and carrying wheels, means engaging the wheels for rotating the head for dumping the rake, a toggle for holding the teeth in ground engaging position, said toggle being proportioned to go over-center when in holding position, a curved member connected for controlling said toggle, a rock shaft controlled from a position on the tractor, a tongue on said rock shaft positioned to swing within the curve of said curved member and adapted in one position to maintain said curved member in a position to maintain said toggle in said over-center position, and said tongue when swinging in said curved portion passing from said position in a path to contact said curved portion after leaving said position and to move it in a manner to shift said toggle out of said over-center position, and means connected with said rock shaft for actuating said wheel engaging means after said toggle has been moved out of said over-center position.

2. For use with a tractor drawn dump rake, comprising a rake head, provided with rake teeth, a frame and carrying wheels, mechanism for dumping the rake, actuating means for the mechanism, toggle means extending between the rake head and frame and having a position for holding the teeth in ground engaging position, and dumping control means comprising an operating member supported on the frame and controlled from a position on the tractor, said member having a portion connected to said toggle means for maintaining the latter in holding position said portion being movable for releasing and moving said toggle means out of holding position, and said operating member having means for engaging said dumping mechanism actuating means after the holding means has been released.

3. In a tractor drawn dump rake, having a head, rake teeth and carrying wheels, a manually operable member having a position for holding said head in position for raking, and a second manually operable member adapted to connect said rake head to said carrying wheels for dumping said rake, a rock shaft controlled from a position on the tractor, a connection from said rock shaft for optionally holding the first mentioned manually operable member in holding position and releasing and moving said first mentioned manually operable member out of holding position, and a connection from said rock shaft adapted to actuate said second manually operable member when said first mentioned manually operable member is released.

4. In a dump rake having a frame and a head rotatable relatively to the frame about a predetermined center line, carrying wheels, and said head being engageable with the wheels for raising movement for dumping, an assisting spring tensioned between said frame and said head, and a connection from said spring to said head on a line so related to said center line as to tend to raise said head, said connection having a plurality of positions of engagement with said head at least one of said positions defining a line so related to said center line that the pull of said spring tends to urge said head downwardly to maintain it in contact with the material being raked.

5. In a tractor drawn dump rake having a head, rake teeth and carrying wheels, means engaging the wheels for rotating the head for dumping the rake, a toggle for holding the teeth in ground engaging position, a curved member connected for controlling said toggle, a rock shaft controlled from a position on the tractor, a tongue on said rock shaft positioned to swing within the curve of said curved member and adapted in one position to maintain said curved member in a position to maintain, through said toggle, said rake teeth in ground engaging position, and said tongue when swinging in said curved portion passing from said position in a path to contact said curved portion after leaving said position, and to move it in a manner to cause said toggle to shift said rake teeth out of ground engaging position, and means connected with said rock shaft for actuating said wheel engaging means after said tongue has been moved out of the first mentioned position.

ALVAH E. RUTTER.